United States Patent
Bartels et al.

(10) Patent No.: US 11,851,056 B2
(45) Date of Patent: Dec. 26, 2023

(54) METHOD FOR ENDING A DRIVE OF A TRANSPORTATION VEHICLE

(71) Applicant: VOLKSWAGEN AKTIENGESELLSCHAFT, Wolfsburg (DE)

(72) Inventors: Arne Bartels, Wolfsburg (DE); Thomas Kolms, Wasbüttel (DE); Timo Klingemann, Sassenburg (DE); Robin Bräutigam, Frechen (DE); Amogh Sakpal, Brühl (DE)

(73) Assignee: Volkswagen Aktiengesellschaft

( * ) Notice: Subject to any disclaimer, the term of this patent is extended or adjusted under 35 U.S.C. 154(b) by 774 days.

(21) Appl. No.: 16/872,416

(22) Filed: May 12, 2020

(65) Prior Publication Data

US 2020/0361460 A1 Nov. 19, 2020

(30) Foreign Application Priority Data

May 13, 2019 (DE) ...................... 10 2019 206 883.9

(51) Int. Cl.
*B60W 30/12* (2020.01)
*B60T 7/12* (2006.01)
*B60W 10/18* (2012.01)
*B60W 10/20* (2006.01)
*B62D 6/00* (2006.01)

(52) U.S. Cl.
CPC .............. *B60W 30/12* (2013.01); *B60T 7/12* (2013.01); *B60W 10/18* (2013.01); *B60W 10/20* (2013.01); *B62D 6/002* (2013.01); *B60W 2540/12* (2013.01); *B60W 2540/18* (2013.01); *B60W 2710/18* (2013.01); *B60W 2710/205* (2013.01); *B60W 2710/207* (2013.01)

(58) Field of Classification Search
CPC ...... B60W 30/12; B60W 10/18; B60W 10/20; B60W 2540/12; B60W 2540/18; B60W 2710/18; B60W 2710/205; B60W 2710/207; B60T 7/12; B62D 6/002
See application file for complete search history.

(56) References Cited

U.S. PATENT DOCUMENTS 7,694,777 B2   4/2010   Yamashita et al.
8,031,063 B2  10/2011   Schmitz
(Continued)

FOREIGN PATENT DOCUMENTS

CN   101121414 A    2/2008
CN   204020698 U   12/2014
(Continued)

*Primary Examiner* — Jelani A Smith
*Assistant Examiner* — Nada Mahyoob Alqaderi
(74) *Attorney, Agent, or Firm* — BARNES & THORNBURG, LLP

(57) ABSTRACT

A method for terminating driving on the road shoulder by a transportation vehicle includes detection by a detection unit that the transportation vehicle is situated at least partially on a road shoulder, determination of a steering intensity of a manual steering maneuver, and assignment of one of at least two predetermined steering codes to the steering maneuver by a computing unit as a function of the steering intensity. An automatic intervention into a transportation vehicle control is carried out as a function of the assigned steering code.

20 Claims, 2 Drawing Sheets

(56) References Cited

U.S. PATENT DOCUMENTS

| | | | |
|---|---|---|---|
| 8,744,692 B2* | 6/2014 | Carresjo | B60C 23/0486 |
| | | | 701/48 |
| 9,014,921 B2 | 4/2015 | Bretzigheimer et al. | |
| 9,221,466 B2 | 12/2015 | Lich et al. | |
| 9,283,958 B2* | 3/2016 | Ulbricht | B60W 30/00 |
| 9,340,187 B2 | 5/2016 | Hecker et al. | |
| 9,751,556 B1* | 9/2017 | Lin | B62D 5/0481 |
| 9,806,777 B1* | 10/2017 | Doostnejad | H04B 7/0617 |
| 10,023,225 B2 | 7/2018 | Lee et al. | |
| 10,183,697 B2 | 1/2019 | Lee | |
| 10,427,708 B2 | 10/2019 | Kim et al. | |
| 10,942,075 B2 | 3/2021 | Oschlies et al. | |
| 2005/0080532 A1* | 4/2005 | Kato | B62D 6/003 |
| | | | 180/443 |
| 2005/0234622 A1* | 10/2005 | Pillar | B60L 3/12 |
| | | | 701/41 |
| 2005/0236210 A1 | 10/2005 | Kawazoe et al. | |
| 2010/0114431 A1* | 5/2010 | Switkes | B62D 6/006 |
| | | | 701/41 |
| 2010/0182139 A1 | 7/2010 | Chen et al. | |
| 2013/0066522 A1* | 3/2013 | Haas | B62K 21/00 |
| | | | 701/41 |
| 2015/0046015 A1* | 2/2015 | Ulbricht | B60W 30/00 |
| | | | 701/1 |
| 2017/0043787 A1* | 2/2017 | Mangette | B60W 50/0098 |
| 2018/0105171 A1 | 4/2018 | Tsuji et al. | |

FOREIGN PATENT DOCUMENTS

| | | | | |
|---|---|---|---|---|
| CN | 106741165 A | 5/2017 | | |
| CN | 106956718 A | 7/2017 | | |
| CN | 107031707 A | 8/2017 | | |
| CN | 107161206 A | 9/2017 | | |
| CN | 107458466 A | 12/2017 | | |
| DE | 10214612 A1 | 10/2003 | | |
| DE | 10244204 A1 | 4/2004 | | |
| DE | 10342528 A1 | 4/2005 | | |
| DE | 102007029909 A1 | 1/2009 | | |
| DE | 102010012497 A1 | 9/2011 | | |
| DE | 102011080789 A1 | 2/2012 | | |
| DE | 102011082567 A1 | 3/2013 | | |
| DE | 102015203026 A1 | 8/2016 | | |
| DE | 102015217783 A1 | 3/2017 | | |
| EP | 1522484 A2 * | 4/2005 | | B60T 8/1764 |
| EP | 9283958 * | 4/2005 | | B62D 6/003 |
| EP | 1561629 A2 | 8/2005 | | |
| EP | 1588922 A2 | 10/2005 | | |
| EP | 1601561 A2 | 12/2005 | | |
| EP | 1995136 A1 | 11/2008 | | |

* cited by examiner

METHOD FOR ENDING A DRIVE OF A TRANSPORTATION VEHICLE

PRIORITY CLAIM

This patent application claims priority to German Patent Application No. 10 2019 206 883.9, filed 13 May 2019, the disclosure of which is incorporated herein by reference in its entirety.

SUMMARY

Illustrative embodiments relate to a method for terminating driving on the road shoulder by a transportation vehicle, a corresponding system, and a computer program.

BRIEF DESCRIPTION OF THE DRAWINGS

Exemplary embodiments are described below. The following are depicted.

DETAILED DESCRIPTION

Figure 1:
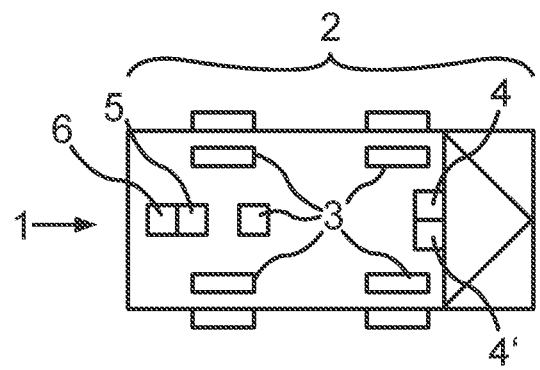
FIG. 1 shows a transportation vehicle comprising an exemplary embodiment of a system for terminating driving on the road shoulder.

When a transportation vehicle drives on a road shoulder, i.e., in a situation in which at least one wheel of the transportation vehicle is situated on a road shoulder next to a roadway, and at least one opposite wheel is on the roadway, a so-called µ-split situation exists. Here, µ represents, for example, the coefficient of friction between the respective wheels and the corresponding substrate. For example, the left wheels of the transportation vehicle are situated on the roadway having a high coefficient of friction, for example, cement or asphalt, whereas the right wheels of the transportation vehicle are situated on the road shoulder having a low coefficient of friction, for example, grass, gravel, or sand. If the driver of the transportation vehicle recognizes this situation and attempts to steer the transportation vehicle back onto the roadway, it may occur that the driver performs excessive steering, braking, or acceleration maneuvers, and as a consequence, loses control over the transportation vehicle or drives further than intended in the direction of the opposite side of the road. As a result, serious accidents may occur.

Known driver assistance systems, for example, ESC systems, cannot prevent the transportation vehicle from skidding or oversteering in every situation, in particular, if the driver exhibits a particularly intensive reaction. In addition, optical driver assistance systems which are based on cameras or the like, cannot detect lane marking lines or roadway edges in every situation; thus, even such systems cannot reliably prevent accidents due to driving on the road shoulder.

The document US 2010/0182139 A1 describes a method for warning a driver of a lane departure. For this purpose, a period of time is estimated within which it is anticipated that the lane departure will occur, and a fatigue index of the driver is determined. For the estimation, for example, a time profile of the steering angle may be detected.

Against this background, disclosed embodiments provide an improved concept for terminating driving on the road shoulder by a transportation vehicle, which makes it possible to terminate the driving on the road shoulder more quickly, more safely, or more reliably.

This is achieved by the disclosed method, system, and computer program.

The improved concept is based on the idea, in the case of driving on the road shoulder, of determining a steering intensity of a manual steering maneuver by a driver, and classifying the steering maneuver according to the steering intensity. Depending on the classification, an automatic intervention into the transportation vehicle control is carried out.

According to an exemplary embodiment, a method is provided for terminating driving on the road shoulder by a transportation vehicle, wherein by a detection unit of the transportation vehicle, it is detected that the transportation vehicle is situated at least partially on a road shoulder, and a steering intensity of a manual steering maneuver, in particular, by a driver of the transportation vehicle, is determined by a steering sensor unit of the transportation vehicle. A steering code, in particular, exactly one of at least two predetermined steering codes, is assigned to the steering maneuver by a computing unit of the transportation vehicle, as a function of the steering intensity. An automatic intervention into a transportation vehicle control is carried out by a control unit of the transportation vehicle, as a function of the steering code which is assigned to the steering maneuver.

The manual steering maneuver comprises a manual actuation of a steering wheel or an alternative steering element by the driver in response to the existence of the driving on the road shoulder.

The steering intensity may, for example, be a function of a value of a steering angle, a steering angle acceleration and/or steering angular velocity during the manual steering maneuver.

The transportation vehicle being at least partially on the road shoulder may be understood to mean that the transportation vehicle is driving with at least one wheel of the transportation vehicle on the road shoulder.

Here and below, driving on the road shoulder by a transportation vehicle may be understood to mean that at least one wheel of the transportation vehicle is situated on a road shoulder while the transportation vehicle is being driven, while at least one additional wheel of the transportation vehicle, in particular, an additional wheel situated on an opposite side of the transportation vehicle with respect to the wheel, is not situated on a road shoulder, but in particular, on a roadway. In the case of a transportation vehicle having four wheels, in the case of driving on the road shoulder, for example, a right or a left wheel is situated on the road shoulder, while all other wheels are situated on the roadway, or both right wheels or both left wheels are situated on the road shoulder, while the remaining two wheels are situated on the roadway.

Here, and below, a roadway may be understood to mean a paved area which is provided for normal transportation vehicle traffic, i.e., in particular, a paved road, for example, an asphalted road, a concrete road, or a cobblestone road.

Here and below, a road shoulder may be understood to mean an unpaved area next to the roadway, in particular, laterally next to the roadway. The road shoulder may, for example, comprise a grass surface, a gravel surface, a gravel lawn, or another unpaved surface. In particular, a surface quality of the road shoulder differs from the surface quality of the roadway.

In particular, respective coefficients of friction of a wheel of the transportation vehicle differ on the roadway and on the road shoulder. The coefficient of friction on the roadway is higher than the coefficient of friction on the road shoulder. Accordingly, in the case of driving on the road shoulder, a so-called µ-split situation exists.

The detection unit may, for example, comprise a camera system and/or a system for detecting a wheel movement of the transportation vehicle. The detection unit may also comprise a system for detecting a transportation vehicle state variable, such as a transportation vehicle acceleration, a yaw rate, a wheel rotational speed; or a sensor system for identifying a quality of the roadway surface. The detection unit may thereby, in particular, together with the computing unit, calculate a code for a probability that at least one wheel of the transportation vehicle is situated on a road shoulder. For example, for this purpose, a time profile of the wheel rotational speed, of a wheel slip, of a transverse acceleration, of a longitudinal acceleration and/or a vertical acceleration of the transportation vehicle, of a yaw rate of the transportation vehicle, of a downward spring deflection of one or several wheels of the transportation vehicle, or of a shock absorber acceleration of one or several shock absorbers, in particular, wheel shock absorbers, of the transportation vehicle may be determined.

If the detection unit comprises an optical system, an optical sensor system, for example, a camera system or a lidar system, or a radar system, it is thus possible, for example, to monitor an environment of the transportation vehicle, and to identify a roadway stripe marking, a roadway edge, or other infrastructure features in the vicinity of the transportation vehicle, and on the basis thereof, to determine the position of the transportation vehicle laterally with respect to the roadway or the roadway borders. The existence of the driving on the road shoulder may also be detected in this way.

The automatic intervention into the transportation vehicle control may, as a function of the assigned steering code, be an intervention having an effect which opposes the manual steering maneuver, or may be an intervention having an effect which supports the manual steering maneuver.

The at least two predetermined steering codes may, for example, comprise two or three driving codes, for example, a first, a second, and a third steering code. The codes may be understood, for example, as being for determining corresponding driver reaction classes of a reaction by the driver to the existence of the driving on the road shoulder, i.e., a driver reaction. The driver reaction comprises the manual steering maneuver and may also comprise other manual maneuvers, for example, a manual braking maneuver or a manual propulsion or acceleration maneuver by the driver.

For example, the first driver reaction class or first steering code may correspond to a non-existent, absent, insignificant, or insufficient driver reaction. The second driver reaction class or second steering code may, for example, correspond to an appropriate driver reaction in which oversteering or skidding by the transportation vehicle or a loss of control by the driver over the transportation vehicle is not to be expected. The third driver reaction class or third steering code may, for example, correspond to an excessive driver reaction. In the case of an excessive driver reaction, for example, oversteering or skidding by the transportation vehicle or loss of control by the driver over the transportation vehicle must be expected.

The automatic intervention in the case of the second driver reaction class, i.e., in the case of an appropriate driver reaction, may support the manual steering maneuver, and in the case of the third driver reaction class, i.e., in the case of an excessive driver reaction, may attenuate, i.e., counteract, the manual steering maneuver by the driver.

According to a method for terminating driving on the road shoulder according to the improved concept, the driver reaction may be determined and classified precisely based on the steering intensity of the manual steering maneuver. Differently acting automatic corrections or interventions into the transportation vehicle control may be carried out, depending on the driver reaction. The fact that this is beneficial ultimately stems from the existence of the µ-split situation.

In a method according to the improved concept, the steering intensity is taken into consideration in a differentiated manner as an important influencing variable for the behavior of the transportation vehicle when terminating the µ-split situation, in particular, in the case of the occurrence of the operation change in the coefficient of friction.

For example, if the driver recognizes the existence of the driving on the road shoulder, the driver may react by excessive steering and/or braking. In such a case, which may occur in the case of higher steering intensity, the opposing intervention into the transportation vehicle control may be carried out via the method by the control unit, to attenuate the overreaction by the driver. However, if the driver reacts appropriately or even less intensively than appropriate, it may be expedient to assist the driver via the intervention into transportation vehicle control, i.e., to amplify the effect of the manual steering maneuver appropriately. Both situations are covered in a method according to the improved concept, and the driving on the road shoulder is terminated as quickly, safely, and reliably as possible in each case.

By the differentiated consideration of the steering intensity, it is possible to handle the driver reaction in a specific manner in the actual individual case; thereby, on the one hand, increasing safety when terminating the driving on the road shoulder, and on the other hand, in particular, in the case of an appropriate driver reaction, making it possible to accelerate the termination of the driving on the road shoulder and to counteract oversteering of the transportation vehicle in advance.

According to at least one disclosed embodiment of the method for terminating the driving on the road shoulder, for determining the steering intensity, a steering angle of the steering maneuver is determined, in particular, by a steering angle sensor of the transportation vehicle. The first steering code of the steering codes is assigned to the steering maneuver if a magnitude of the steering angle is less than or equal to a predetermined first steering angle limit value.

The first steering angle limit value corresponds to a steering angle which must at least be achieved by the manual steering maneuver to recognize or identify the steering maneuver as such, or to determine an intention of the driver to steer the transportation vehicle off of the road shoulder. Accordingly, the first code is, for example, assigned to the steering maneuver if, based on the determined steering angle of the steering maneuver, it is determined that the driver is not steering the transportation vehicle off of the road shoulder.

The steering angle sensor may be a steering angle sensor which an electronic stability control (ESC) system also uses to detect and analyze the steering angle, and to compare it with the actual direction of movement of the transportation vehicle. If, for example, the transportation vehicle does not follow the steering angle set by the driver, thus corresponding to understeering or oversteering of the transportation vehicle, the ESC system may set the direction of movement desired by the driver via wheel-selective braking interventions.

A fatigue assistance system of the transportation vehicle may analyze the steering behavior of the driver, and may possibly use the same steering angle sensor for this purpose.

Accordingly, the presence of the steering angle sensor may be used for other driver assistance systems in a method for terminating the driving on the road shoulder, so that a synergy effect and corresponding cost savings are possible.

The steering angle is continuously or repeatedly determined during a predetermined time interval for determining the steering intensity. The first steering code is assigned to the steering maneuver if it is determined by the steering angle sensor that the magnitude of the steering angle during the entire time interval is less than or equal to the steering angle limit value.

The steering angle is a particularly meaningful parameter for characterizing the steering intensity. The greater the steering angle is, the greater the steering intensity tends to be.

According to at least one disclosed embodiment, a steering angular velocity of the steering maneuver is determined for determining the steering intensity. A second steering code of the at least two steering codes is assigned to the steering maneuver if the magnitude of the steering angle is greater than the first steering angle limit value, in particular, at least once during the time interval, and a magnitude of the steering angular velocity is less than or equal to a predetermined steering velocity limit value, in particular, during the entire time interval.

In this case, the steering angular velocity may be determined by a steering velocity sensor, wherein the steering angle sensor, for example, is also configured to determine the steering angular velocity, or the computing unit, for example, is configured to compute the steering angular velocity from the determined steering angle and the time profile thereof.

As a result of the fact that the steering angle is greater than the first steering angle limit value, in such a case, for example, it is determined that the driver is steering the transportation vehicle off of the road shoulder. However, it is not yet determined whether the driver is reacting appropriately or excessively.

The steering velocity limit value corresponds, for example, to a limit value which must be exceeded to be able to assume an excessive driver reaction. Thus, if the magnitude of the steering angular velocity during the time interval is always less than or equal to the steering velocity limit value, there is a high probability of an appropriate steering or driver reaction, even if the steering angle exceeds the first steering angle limit value.

Thus, the second steering code is assigned to the steering maneuver if an appropriate steering reaction or steering intensity of the driver reaction can be assumed.

By considering the steering angle and steering angular velocity, it is possible to obtain better and more precise overall information about the steering intensity. The categorization into different steering intensity classes and the assignment of the various steering codes allows a more precise classification of the driver reaction and accordingly a more specific automatic intervention.

According to at least one disclosed embodiment, the second code is assigned to the steering maneuver if the magnitude of the steering angle is greater than the first steering angle limit value, in particular, at least once during the predetermined time interval, and is less than or equal to a predetermined second steering angle limit value, in particular, during the entire interval, and the magnitude of the steering angular velocity is greater than the steering velocity limit value, in particular, at least once during the predetermined time interval.

In this case, an appropriate driver reaction exists, even though the steering angular velocity is greater than the steering velocity limit value, because the steering angle does not exceed the second steering angle limit value. This means that even a high steering angular velocity alone does not necessarily make it possible to conclude an excessive reaction by the driver, but rather, in addition, a correspondingly large steering angle is also required therefor.

According to at least one disclosed embodiment, a third steering code of the at least two predefined steering codes is assigned to the steering action if the magnitude of the steering angle is greater than the first steering angle limit value and greater than the second steering angle limit value, in particular, at least once in each case during the predetermined time interval, and the magnitude of the steering angular velocity is greater than the steering velocity limit value, in particular, once during the time interval.

The third steering code is assigned to the steering action if an excessive driver reaction, in particular, an excessive steering maneuver by the driver, is determined. Exceeding the second steering angle limit value in combination with exceeding the steering velocity limit value makes it correspondingly possible to conclude an excessive reaction by the driver.

If the steering angular velocity is greater than the steering angle limit value, it is thus taken into consideration how much greater the steering angle is than the first steering angle limit value, in particular, whether it is greater than the second steering angle limit value.

In the described embodiments, overall, a differentiated and detailed evaluation and classification, with categorization of the driving behavior, in particular, of the steering maneuver by the driver, is made possible. The steering behavior of the driver constitutes a crucial parameter for characterizing the intensity of the driver reaction.

According to at least one disclosed embodiment, a braking intensity of a manual braking maneuver by the driver is determined by a braking sensor unit of the transportation vehicle. One of at least two predetermined braking codes is assigned to the braking maneuver by the computing unit, as a function of the braking intensity.

The automatic intervention into the transportation vehicle control is carried out as a function of the assigned braking code which was assigned to the braking maneuver, and as a function of the steering code.

By considering the braking behavior as the manual braking maneuver by the driver, a more precise differentiation and assignment of the driver reaction, and an even more specific matching of the automatic intervention into the actual individual case situation, are made possible.

In such disclosed embodiments, the automatic intervention is directed, i.e., whether the intervention is carried out, and if it is carried out, whether it is carried out in such a way that it supports the driver reaction or counteracts it, carried out as a function of the assigned braking code.

According to at least one disclosed embodiment, for determining the braking intensity, a brake pedal displacement during the braking maneuver and/or a brake pedal velocity during the braking maneuver and/or a braking pressure of the braking maneuver is determined by the braking sensor unit.

Brake pedal displacement, brake pedal velocity, and braking pressure respectively constitute suitable parameters for determining an intensity of the braking maneuver. The higher the braking pressure is, the greater the brake pedal velocity is, and greater the brake pedal displacement of the braking maneuver is, the greater the braking intensity is.

The greater the braking intensity is, the higher the probability is that an excessive driver reaction exists, and the sooner it may be expedient to carry out the automatic intervention so as to counteract the driver reaction, in particular, the manual steering maneuver.

According to at least one disclosed embodiment, the braking code and the steering code which was assigned to the braking maneuver or the steering maneuver are weighted according to a predetermined set of weighting factors, by the computing unit. One driver reaction class from at least two predetermined driver reaction classes is determined by the computing unit, as a function of the weighted braking code and the weighted steering code. The intervention into the transportation vehicle control is carried out as a function of the determined driver reaction class.

The steering code constitutes an indication of which reaction by the driver exists, i.e., whether the driver is steering the transportation vehicle off of the road shoulder, and if so, whether it is an appropriate or an excessive reaction by the driver. The braking intensity may have an additional influence on the precise classification of the driver reaction. The steering code may have a greater weight than the braking code.

In other words, it is necessary to detect the steering intensity to recognize whether the driver is steering the transportation vehicle off of the road shoulder. The braking intensity alone is possibly not sufficient for this.

According to at least one disclosed embodiment, a propulsion intensity of a manual propulsion maneuver by the driver is determined by an accelerator pedal unit of the transportation vehicle, and one of at least two predetermined propulsion codes is assigned to the propulsion maneuver by the computing unit, as a function of the propulsion intensity. The intervention into the transportation vehicle control is carried out as a function of the assigned propulsion code which was assigned to the propulsion maneuver.

The propulsion maneuver is the actuation of an accelerator pedal or gas pedal of the transportation vehicle. The propulsion intensity is an intensity of the actuation of the accelerator pedal.

For determining the propulsion intensity, for example, an accelerator pedal displacement during the propulsion maneuver and/or an accelerator pedal velocity during the propulsion maneuver may be determined.

According to at least one disclosed embodiment, the braking code, the steering code, and the propulsion code are weighted by the computing unit according to the predetermined set of weighting factors; the driver reaction class is determined by the computing unit, as a function of the weighted braking code, the weighted steering code, and the weighted propulsion code; and the intervention into the transportation vehicle control is carried out as a function of the determined driver reaction class.

By taking into consideration the actuation of the accelerator pedal, a further differentiation and a further, more precise classification of the driver reaction are made possible. The descriptions with respect to the braking maneuver also apply analogously to the propulsion maneuver. When weighting the codes, the propulsion code may be weighted more weakly than the braking code.

According to at least one disclosed embodiment, by the control unit, the automatic intervention is carried out as an intervention which opposes the manual steering maneuver, if the determined driver reaction class corresponds to a first driver reaction class of the at least two driver reaction classes. The automatic intervention is carried out as an intervention which supports the manual steering maneuver, if the determined driver reaction class corresponds to a second driver reaction class of the at least two driver reaction classes.

In this case, the first driver reaction class corresponds to an excessive driver reaction in which oversteering or a loss of control of the transportation vehicle, in particular, when terminating the driving on the road shoulder, is to be expected with a high probability. The second driver reaction class corresponds to a driver reaction which is considered to be appropriate to terminate the driving on the road shoulder without loss of control over the transportation vehicle.

According to at least one disclosed embodiment, no intervention into the transportation vehicle control is automatically carried out if the particular driver reaction class corresponds to a third driver reaction class of the at least two driver reaction classes.

The third driver reaction class corresponds to a driver reaction which makes it possible to conclude that the driver has introduced no measures to drive the transportation vehicle off of the road shoulder. In such a situation, it might constitute a safety hazard to carry out an automatic intervention nevertheless, as it may possibly be unexpected by the driver.

For example, if the driver reaction class corresponds to the third driver reaction class, a warning signal may be output to the driver by the computing unit, to advise the driver of the existence of the driving on the road shoulder, or to prompt the driver to take measures to terminate the driving on the road shoulder.

According to a further exemplary embodiment, a system is provided for terminating driving on the road shoulder by a transportation vehicle, wherein the system comprises a detection unit which is configured to recognize that the transportation vehicle is at least partially situated on a road shoulder. The system comprises a steering sensor unit which is configured to determine a steering intensity of a manual steering maneuver by a driver of the transportation vehicle. The system comprises a computing unit which is configured to assign one of at least two predetermined steering codes to the steering maneuver, as a function of the steering intensity. The system comprises a control unit which is configured to carry out an automatic intervention into a transportation vehicle control of the transportation vehicle, as a function of the assigned steering code.

Additional embodiments of the system for terminating the driving on the road shoulder follow directly from the various embodiments of the method for terminating the driving on the road shoulder, and vice-versa. The disclosed system may be configured or programmed for carrying out a disclosed method, or the system carries out a disclosed method.

According to a further disclosed embodiment, a computer program comprising commands is provided. If the computer program is executed according to the improved concept, in particular, by a computing unit of the system, the commands cause the system to carry out a method for terminating driving on the road shoulder according to the improved concept.

According to a further exemplary embodiment, a computer-readable storage medium is provided, on which a computer program according to the improved concept is stored.

According to a further independent exemplary embodiment, a transportation vehicle is provided which comprises a system for terminating driving on the road shoulder and/or a computer-readable storage medium according to the improved concept.

The present disclosure also comprises refinements of the disclosed method which have features as have already been described in conjunction with the refinements of the disclosed system. Therefore, the corresponding refinements of the disclosed method are not described again.

The present disclosure also comprises the combinations of the features of the described embodiments.

In the exemplary embodiments, the described components of the exemplary embodiments respectively constitute individual features of the present disclosure which are to be considered independently of one another, and which also respectively refine the present disclosure independently of one another, and which are thus also to be considered to be a component of the present disclosure individually or in a combination other than the one depicted. In addition, the described embodiments may also be supplemented by additional features of the present disclosure which have already been described.

In the figures, functionally equivalent elements are provided with the same reference characters.

FIG. 1 depicts a transportation vehicle 1 comprising an exemplary embodiment of a system 2 for terminating driving on the road shoulder by the transportation vehicle 1, according to the improved concept.

The system 2 comprises a detection unit 3 which may comprise several sensors or sensor units which can determine wheel movements of the wheels of the transportation vehicle 1 and/or transportation vehicle state variables of the transportation vehicle 1, for example, a transverse, longitudinal, or vertical acceleration, a rotational or yaw rate of the transportation vehicle, or the like. The detection unit 3 may also comprise a camera system or an optical sensor system to monitor an environment of the transportation vehicle 1 and, for example, to recognize infrastructure features in the environment, for example, a lane marking line or a roadway edge. Based on respective sensor signals or sensor units of the detection unit 3, the unit can detect whether a wheel of the transportation vehicle 1 is situated on a road shoulder.

In addition, the system 2 comprises a steering sensor unit 4 which can determine a steering angle of a steering wheel of the transportation vehicle 1 and a steering angular velocity of the steering wheel, in particular, to determine a steering intensity of a manual steering maneuver by the driver of the transportation vehicle 1.

Optionally, the system 2 comprises a braking sensor unit 4' which, for example, can determine a brake pedal velocity, a braking pressure, and/or a brake pedal displacement of a brake pedal of the transportation vehicle 1, to determine a braking intensity of a manual braking maneuver by the driver.

In addition, the system 2 comprises a computing unit 5 which is configured to assign one of at least two predetermined steering codes to a steering maneuver by the driver, as a function of the steering intensity, and optionally, to assign one of at least two predetermined braking codes to the braking maneuver, as a function of the measured values of the steering sensor unit 4, and optionally, as a function of the measured values of the braking sensor unit 4'.

The system 2 also comprises a control unit 6 which can carry out or introduce an automatic intervention into a transportation vehicle control, in particular, into a steering or braking system of the transportation vehicle 1, as a function of the steering code and optionally also as a function of the braking code.

Optionally, the system 2 comprises a computer-readable storage medium (not depicted), on which, for example, a computer program according to the improved concept can be stored, and to which the computing unit 5 can have read access, to carry out a method according to the improved concept.

The function of the system 2 will be described in greater detail based on exemplary embodiments of a method for terminating driving on the road shoulder according to the improved concept, with respect to FIG. 2 and FIG. 3.

Figure 2:
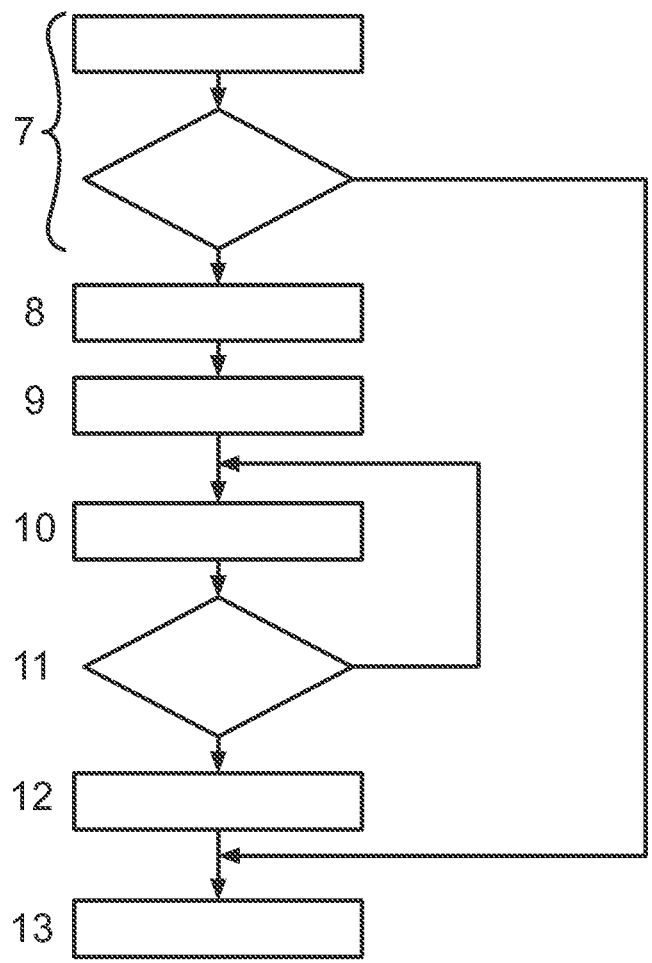
FIG. 2 depicts a flow chart of an exemplary embodiment of a method.

FIG. 2 depicts a flow chart of a method for terminating the driving on the road shoulder according to the improved concept.

In operation at 7 of the method, it is detected, based on the detection unit 3 of the transportation vehicle 1, whether driving on the road shoulder by the transportation vehicle exists, i.e., whether at least one wheel of the transportation vehicle 1 is situated on the road shoulder.

If it is determined in operation at 7 that no driving on the road shoulder exists, in operation at 13 of the method, the normal driving of the transportation vehicle 1 is continued.

If it is determined in operation at 7 that driving on the road shoulder exists, in operation at 8, a driver reaction is ascertained and classified, in that, for example, a driver reaction class is determined which, for example, may be a function of a steering intensity of a manual steering maneuver by the driver, and/or may be a function of a braking intensity of a manual braking maneuver by the driver.

In operation at 8, it is determined whether the driver is steering the transportation vehicle 1 off of the road shoulder. If this is the case, in operation at 8, it is also determined whether the steering maneuver and/or the braking maneuver correspond to an appropriate reaction or an excessive reaction to the driving on the road shoulder. Accordingly, the driver reaction is assigned to a first, a second, or a third driver reaction class.

Figure 3:
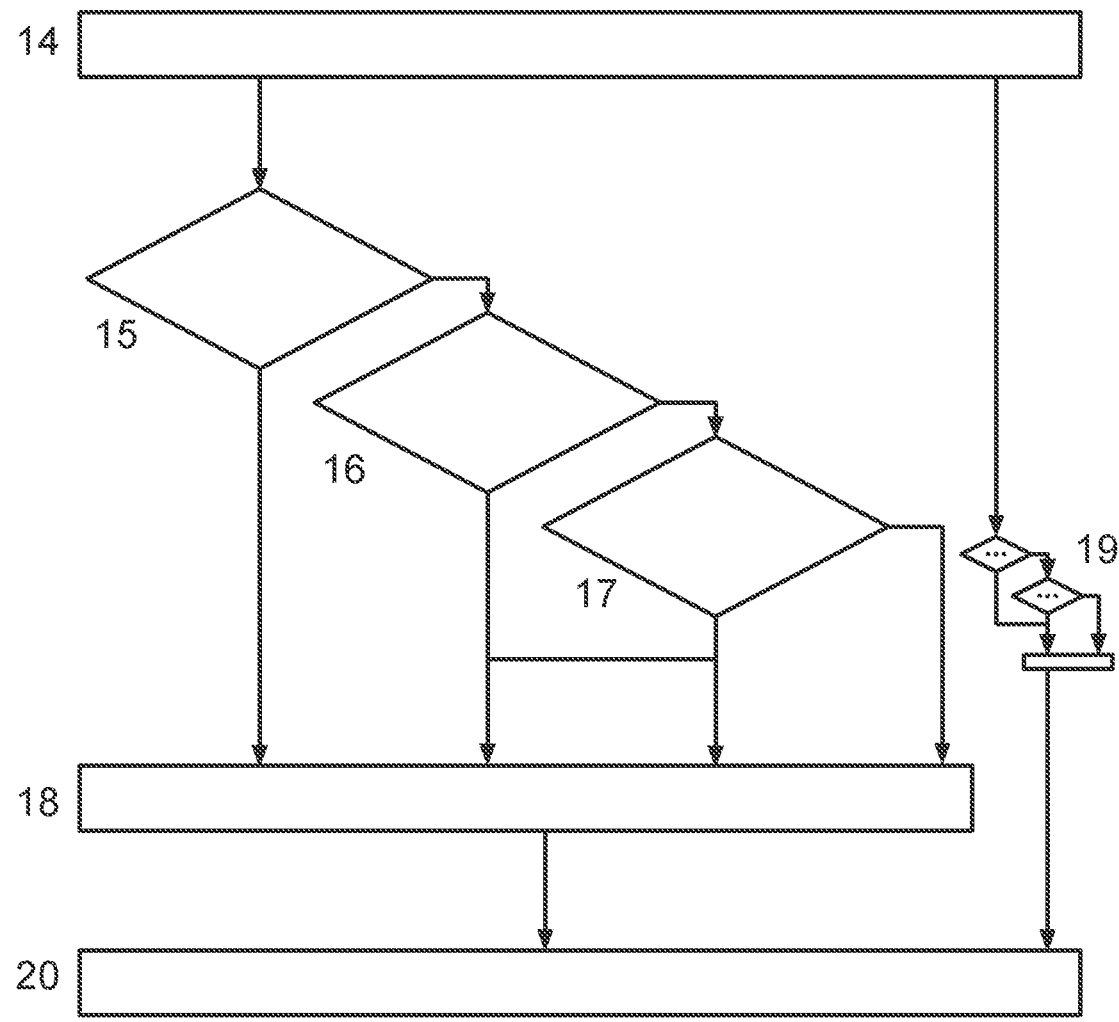
FIG. 3 depicts a flow chart of a portion of an additional exemplary embodiment of a method for terminating driving on the road shoulder.

For further details for determining the driver reaction class, reference is made to the descriptions for FIG. 3.

In operation at 9 of the method, an automatic intervention into a transportation vehicle control of the transportation vehicle 1 is carried out by the control unit 6, as a function of the driver reaction class.

If the driver reaction class corresponds to the first driver reaction class, this means that an excessive reaction by the driver exists. In this case, the automatic intervention is carried out in such a way that its effect opposes the driver reaction, in particular, the steering maneuver by the driver, i.e., it corresponds to a stabilizing effect.

In addition, for example, an automatic intervention into the steering system of the transportation vehicle 1 may be carried out in such a way that the transportation vehicle is steered in the direction of the road shoulder. Alternatively or additionally, a single-wheel braking intervention may be carried out at at least one wheel of the transportation vehicle 1 which is situated on the road shoulder.

If the driver reaction class corresponds to the second driver reaction class, an appropriate reaction by the driver exists. In this case, the intervention into the transportation vehicle control is, for example, carried out in such a way that its effect is aligned with the effect of the driver reaction, in particular, the manual steering maneuver, such that the intervention has, for example, the effect of increasing agility.

This may, for example, occur in that a steering intervention toward the roadway, i.e., away from the road shoulder, is automatically carried out. Alternatively or additionally, a selective single-wheel braking intervention at a wheel of the transportation vehicle 1 situated on the roadway may be carried out.

If the driver reaction class corresponds to a third driver reaction class, it is concluded that the driver is not steering the transportation vehicle 1 off of the road shoulder. In this case, for example, no intervention into the transportation vehicle control is carried out. For example, a warning signal may be output to the driver.

In operations at 10 and 11, stabilization or increasing of agility, in particular, of the respective intervention into the transportation vehicle control, or the warning, is continued, and it is checked whether the transportation vehicle 1 has left the road shoulder. If this is not the case, operations at 10 and 11 are iteratively repeated until the transportation vehicle 1 has left the road shoulder. However, if the transportation vehicle 1 has left the road shoulder, in operation at 12, the intervention or the warning is terminated, and in operation at 13, normal driving is resumed.

FIG. 3 depicts a flow chart of a portion of a further exemplary embodiment of the method according to the improved concept, in particular, a portion as may be carried out in operation at 8 of the method from FIG. 2.

In operation at 14 of the method, signals of the steering sensor unit 4, and optionally signals of the braking sensor unit 4', are detected by the computing unit 5. The steering angle, the steering angular velocity, the brake pedal displacement, the brake pedal velocity, and/or the braking pressure may be detected by the computing unit 5.

In operation at 15, it is checked whether the magnitude of the steering angle during a predetermined time interval, in particular, during the entire time interval, is less than or equal to a predetermined first steering angle limit value. If this is the case, it is concluded that the driver has introduced no measures to steer the transportation vehicle 1 off of the road shoulder. Therefore, a first steering code is assigned to the steering maneuver, and the method continues with operation at 18.

If the steering angle exceeds the first steering angle limit value at least once during the time interval, the method continues with operation at 16.

In operation at 16, it is checked, in particular, by the computing unit 5, whether a magnitude of the steering angular velocity during the entire time interval is less than or equal to a steering velocity limit value. If this is the case, it is concluded that an appropriate steering intensity, i.e., an appropriate steering maneuver by the driver, exists; a second steering code is assigned to the steering maneuver, and the method continues with operation at 18. On the other hand, if it is determined that the steering velocity limit value has been exceeded at last once in the time interval, the method continues with 17.

In operation at 17, it is checked whether the steering angle during the entire time interval is less than or equal to a second steering angle limit value. If this is the case, it is concluded, in particular, despite a relatively high steering angular velocity, that an appropriate steering reaction by the driver exists; the second steering code is assigned to the steering maneuver, and the method continues with operation at 18. If the second steering angle limit value is exceeded at least once during the time interval, it is concluded that an excessive steering reaction by the driver exists; the third steering code is assigned to the steering maneuver, and the method continues with operation at 18.

In 18, the first, the second, or the third steering code is assigned to the steering maneuver by the computing unit 5, according to the result of the tests in operations at 15 to 17, and the steering code is optionally weighted.

In an optional operation at 19, a braking intensity of a manual braking maneuver by the driver is ascertained. A braking code is determined and optionally also weighted, as a function of the ascertained braking intensity, which, for example, may be determined based on the brake pedal displacement, the brake pedal velocity, and/or the braking pressure.

In operation at 19, the driver reaction class is determined from the steering code or from the weighted steering code, together with the weighted braking code, as described with respect to FIG. 2.

With the aid of the steering sensor unit 4 and optionally with the aid of the braking sensor unit 4' and by upstream software modules, the driver's intention may thus be determined by determining the driver's inputs at the steering wheel, at the brake pedal, or optionally at the accelerator pedal of the transportation vehicle 1, and provided to the method. The check in operation at 15 of whether the driver is steering the transportation vehicle 1 off of the road shoulder may, for example, be based on a determination of a sign of the steering angle and the information about whether the left or the right wheels of the transportation vehicle 1 are situated on the road shoulder.

To classify the steering maneuver by the driver as excessive, in particular, two conditions must be met. The predetermined steering velocity limit value and the second steering angle limit value must respectively have been exceeded at least once within the time interval.

In an analogous manner, a driver input at the brake pedal and/or at the accelerator pedal may be classified.

The individual classifications may be summarized into an overall driver reaction, to which the driver reaction class can be assigned, as described. If the inputs at the braking and/or accelerator pedal are not used for determining the driver reaction class, the driver reaction class has already been unambiguously determined by the steering code.

As described, by the improved concept, a possibility is provided to introduce an automatic reaction to driving on the road shoulder which is specifically customized to the individual case, or a corresponding driver reaction. As a result, the driving on the road shoulder may be safely, reliably, and quickly terminated.

LIST OF REFERENCE CHARACTERS

1 Transportation vehicle
2 System
3 Detection unit
4 Steering sensor unit
4' Braking sensor unit
5 Computing unit
6 Control unit
7-20 Method operations

The invention claimed is:
1. A system for terminating driving on the road shoulder by a transportation vehicle, the system comprising:
  a detection unit to detect that the transportation vehicle is at least partially situated on a road shoulder;
  a steering sensor unit to determine a steering intensity of a manual steering maneuver;

a computing unit to assign one of at least two predetermined steering codes to the manual steering maneuver as a function of the steering intensity, the at least two predetermined steering codes each corresponding to a reaction behavior of a driver of the transportation vehicle in response to driving on the road shoulder, the at least two predetermined steering codes including a second steering code that is predetermined based on conditions of the road shoulder and is indicative of the manual steering maneuver to terminate the driving on the road shoulder without loss of control over the transportation vehicle and a third steering code that is predetermined based on conditions of the road shoulder and is indicative of the manual steering maneuver to terminate the driving on the road shoulder with loss of control over the transportation vehicle; and a control unit to perform an automatic intervention into a transportation vehicle control as a function of the assigned steering code, the automatic intervention supporting the manual steering maneuver to terminate the driving on the road shoulder in response to the assigned steering code being the second steering code and opposing the manual steering maneuver to terminate the driving on the road shoulder in response to the assigned steering code being the third steering code.

2. The system of claim 1, wherein:
a steering angle of the manual steering maneuver is determined for determining the steering intensity; and
the first steering code of the steering codes to the manual steering maneuver is assigned in response to a magnitude of the steering angle being less than or equal to a predetermined first steering angle limit value.

3. The system of claim 2, wherein:
a steering angular velocity of the manual steering maneuver is determined for determining the steering intensity; and
the second steering code of the steering codes to the manual steering maneuver is assigned in response to:
the magnitude of the steering angle being greater than the first steering angle limit value, and
a magnitude of the steering angular velocity being less than or equal to a predetermined steering velocity limit value.

4. The system of claim 3, wherein the second steering code is assigned to the manual steering maneuver in response to:
the magnitude of the steering angle being greater than the first steering angle limit value and less than or equal to a predetermined second steering angle limit value, and
the magnitude of the steering angular velocity being greater than the steering velocity limit value; and
a third steering code of the steering codes is assigned to the steering action in response to:
the magnitude of the steering angle being greater than the first steering angle limit value and greater than the second steering angle limit value, and
the magnitude of the steering angular velocity being greater than the steering velocity limit value.

5. The system of claim 1, wherein a braking intensity of a manual braking maneuver is determined by a braking sensor unit of the transportation vehicle, one of at least two predetermined braking codes is assigned to the braking maneuver by the computing unit as a function of the braking intensity, and the automatic intervention is performed into the transportation vehicle control as a function of the assigned braking code.

6. The system of claim 5, wherein, for determining the braking intensity, a brake pedal displacement of the braking maneuver and/or a brake pedal velocity of the braking maneuver and/or a braking pressure of the braking maneuver are determined.

7. The system of claim 5, wherein:
the braking code and the steering code are weighted based on a predetermined set of weighting factors by the computing unit;
one driver reaction class of at least two predetermined driver reaction classes is determined by the computing unit as a function of the weighted braking code and the weighted steering code; and
the intervention into the transportation vehicle control is performed as a function of the determined driver reaction class.

8. The system of claim 7, wherein the control unit, carries out the automatic intervention as an intervention which opposes the manual steering maneuver, in response to the determined driver reaction class corresponding to a first driver reaction class; and
carries out the automatic intervention as an intervention which supports the manual steering maneuver, in response to the determined driver reaction class corresponding to a second driver reaction class.

9. A method for terminating driving on the road shoulder by a transportation vehicle, the method comprising:
detecting by a detection unit of the transportation vehicle that the transportation vehicle is situated at least partially on a road shoulder;
determining a steering intensity of a manual steering maneuver by a steering sensor unit of the transportation vehicle;
assigning one of at least two predetermined steering codes to the manual steering maneuver by a computing unit of the transportation vehicle as a function of the steering intensity, the at least two predetermined steering codes each corresponding to a reaction behavior of a driver of the transportation vehicle in response to driving on the road shoulder, the at least two predetermined steering codes including a second steering code that is predetermined based on conditions of the road shoulder and is indicative of the manual steering maneuver to terminate the driving on the road shoulder without loss of control over the transportation vehicle and a third steering code that is predetermined based on conditions of the road shoulder and is indicative of the manual steering maneuver to terminate the driving on the road shoulder with loss of control over the transportation vehicle; and
carrying out an automatic intervention into a transportation vehicle control by a control unit of the transportation vehicle as a function of the assigned steering code, the automatic intervention supporting the manual steering maneuver to terminate the driving on the road shoulder in response to the assigned steering code being the second steering code and opposing the manual steering maneuver to terminate the driving on the road shoulder in response to the assigned steering code being the third steering code.

10. The method of claim 9, further comprising:
determining a steering angle of the manual steering maneuver for determining the steering intensity; and
assigning the first steering code of the steering codes to the manual steering maneuver in response to a magnitude of the steering angle being less than or equal to a predetermined first steering angle limit value.

11. The method of claim 10, further comprising:
determining a steering angular velocity of the manual steering maneuver for determining the steering intensity; and
assigning the second steering code of the steering codes to the manual steering maneuver in response to:
the magnitude of the steering angle being greater than the first steering angle limit value, and
a magnitude of the steering angular velocity being less than or equal to a predetermined steering velocity limit value.

12. The method of claim 11, further comprising:
assigning the second steering code to the manual steering maneuver in response to:
the magnitude of the steering angle being greater than the first steering angle limit value and less than or equal to a predetermined second steering angle limit value, and
the magnitude of the steering angular velocity being greater than the steering velocity limit value; and
assigning a third steering code of the steering codes to the steering action in response to:
the magnitude of the steering angle being greater than the first steering angle limit value and greater than the second steering angle limit value, and
the magnitude of the steering angular velocity being greater than the steering velocity limit value.

13. The method of claim 9, further comprising:
determining a braking intensity of a manual braking maneuver by a braking sensor unit of the transportation vehicle;
assigning one of at least two predetermined braking codes to the braking maneuver by the computing unit as a function of the braking intensity; and
carrying out the automatic intervention into the transportation vehicle control as a function of the assigned braking code.

14. The method of claim 13, wherein, for determining the braking intensity, a brake pedal displacement of the braking maneuver and/or a brake pedal velocity of the braking maneuver and/or a braking pressure of the braking maneuver are determined.

15. The method of claim 13, further comprising:
weighting the braking code and the steering code based on a predetermined set of weighting factors by the computing unit;
determining one driver reaction class of at least two predetermined driver reaction classes by the computing unit as a function of the weighted braking code and the weighted steering code; and
carrying out the intervention into the transportation vehicle control as a function of the determined driver reaction class.

16. The method of claim 15, wherein the control unit,
carries out the automatic intervention as an intervention which opposes the manual steering maneuver, in response to the determined driver reaction class corresponding to a first driver reaction class; and
carries out the automatic intervention as an intervention which supports the manual steering maneuver, in response to the determined driver reaction class corresponding to a second driver reaction class.

17. A non-transitory medium including a computer program that includes computer commands which, when run on a processor perform functionality of a computing unit and a control unit of a system that is configured to terminate driving on a road shoulder by a transportation vehicle, wherein the functionality includes:
the computing unit assigning one of at least two predetermined steering codes to a manual steering maneuver for which a steering intensity has been determined by a steering sensor unit, wherein the assignment is performed as a function of the steering intensity, the at least two predetermined steering codes each corresponding to a reaction behavior of a driver of the transportation vehicle in response to driving on the road shoulder, the at least two predetermined steering codes including a second steering code that is predetermined based on conditions of the road shoulder and is indicative of the manual steering maneuver to terminate the driving on the road shoulder without loss of control over the transportation vehicle and a third steering code that is predetermined based on conditions of the road shoulder and is indicative of the manual steering maneuver to terminate the driving on the road shoulder with loss of control over the transportation vehicle; and
the control unit performing an automatic intervention into a transportation vehicle control as a function of the assigned steering code, the automatic intervention supporting the manual steering maneuver to terminate the driving on the road shoulder in response to the assigned steering code being the second steering code and opposing the manual steering maneuver to terminate the driving on the road shoulder in response to the assigned steering code being the third steering code.

18. The non-transitory computer readable medium of claim 17, wherein:
a steering angle of the manual steering maneuver is determined for determining the steering intensity; and
the first steering code of the steering codes to the manual steering maneuver is assigned in response to a magnitude of the steering angle being less than or equal to a predetermined first steering angle limit value.

19. The non-transitory computer readable medium of claim 18, wherein:
a steering angular velocity of the manual steering maneuver is determined for determining the steering intensity; and
the second steering code of the steering codes to the manual steering maneuver is assigned in response to:
the magnitude of the steering angle being greater than the first steering angle limit value, and
a magnitude of the steering angular velocity being less than or equal to a predetermined steering velocity limit value.

20. The non-transitory computer readable medium of claim 19, wherein the second steering code is assigned to the manual steering maneuver in response to:
the magnitude of the steering angle being greater than the first steering angle limit value and less than or equal to a predetermined second steering angle limit value, and
the magnitude of the steering angular velocity being greater than the steering velocity limit value; and
a third steering code of the steering codes is assigned to the steering action in response to:
the magnitude of the steering angle being greater than the first steering angle limit value and greater than the second steering angle limit value, and
the magnitude of the steering angular velocity being greater than the steering velocity limit value.

* * * * *